United States Patent
Jain et al.

(10) Patent No.: US 11,297,004 B2
(45) Date of Patent: *Apr. 5, 2022

(54) PROVISIONING NETWORK SERVICES IN A SOFTWARE DEFINED DATA CENTER

(71) Applicant: Nicira, Inc., Palo Alto, CA (US)

(72) Inventors: Jayant Jain, Cupertino, CA (US); Raju Koganty, San Jose, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,867

(22) Filed: Feb. 10, 2020

(65) Prior Publication Data

US 2020/0177518 A1 Jun. 4, 2020

Related U.S. Application Data

(63) Continuation of application No. 14/834,979, filed on Aug. 25, 2015, now Pat. No. 10,581,755.

(Continued)

(51) Int. Cl.
*H04L 12/911* (2013.01)
*G06F 9/50* (2006.01)
(Continued)

(52) U.S. Cl.
CPC .......... *H04L 47/82* (2013.01); *G06F 9/5072* (2013.01); *G06F 9/5077* (2013.01);
(Continued)

(58) Field of Classification Search
None
See application file for complete search history.

(56) References Cited

U.S. PATENT DOCUMENTS 8,805,971 B1 8/2014 Roth et al.
8,856,077 B1 10/2014 Roth et al.
(Continued)

FOREIGN PATENT DOCUMENTS

CN 102681899 A 9/2012
CN 103064744 A 4/2013
(Continued)

OTHER PUBLICATIONS

PCT International Search Report and Written Opinion dated Jun. 20, 2016 for commonly owned International Patent Application PCT/US2016/025763, 12 pages, International Searching Authority (EPO).

*Primary Examiner* — Davoud A Zand
(74) *Attorney, Agent, or Firm* — Adeli LLP

(57) ABSTRACT

A novel method for dynamic network service allocation that maps generic services into specific configurations of service resources in a network is provided. An application that is assigned to be performed by computing resources in the network is associated with a set of generic services, and the method maps the set of generic services to the service resources based on the assignment of the application to the computing resources. The mapping of generic services is further based on a level of service that is chosen for the application, where the set of generic services are mapped to different sets of network resources according to different levels of services.

16 Claims, 10 Drawing Sheets

Related U.S. Application Data

(60) Provisional application No. 62/142,667, filed on Apr. 3, 2015.

(51) Int. Cl.
*H04L 12/24* (2006.01)
*H04L 47/70* (2022.01)
*H04L 41/5051* (2022.01)
*H04L 41/5041* (2022.01)
*H04L 41/50* (2022.01)

(52) U.S. Cl.
CPC ...... *H04L 41/5048* (2013.01); *H04L 41/5051* (2013.01); *H04L 41/5077* (2013.01)

(56) References Cited

U.S. PATENT DOCUMENTS

| | | | |
|---|---|---|---|
| 9,858,559 B2 | 1/2018 | Raleigh et al. | |
| 9,882,968 B1* | 1/2018 | Holgers | H04L 67/10 |
| 10,581,755 B2 | 3/2020 | Jain et al. | |
| 2004/0098447 A1 | 5/2004 | Verbeke et al. | |
| 2005/0114862 A1* | 5/2005 | Bisdikian | G06F 9/5072 |
| | | | 718/105 |
| 2006/0104230 A1* | 5/2006 | Gidwani | H04W 84/00 |
| | | | 370/328 |
| 2007/0008884 A1* | 1/2007 | Tang | H04L 47/283 |
| | | | 370/230 |
| 2007/0171921 A1 | 7/2007 | Wookey et al. | |
| 2011/0225293 A1 | 9/2011 | Rathod | |
| 2012/0089845 A1 | 4/2012 | Raleigh | |
| 2012/0185913 A1 | 7/2012 | Martinez et al. | |
| 2013/0060945 A1 | 3/2013 | Allam et al. | |
| 2013/0132561 A1 | 5/2013 | Pasala et al. | |
| 2013/0232480 A1 | 9/2013 | Winterfeldt et al. | |
| 2013/0262685 A1 | 10/2013 | Shelton et al. | |
| 2013/0282994 A1* | 10/2013 | Wires | G06F 9/45558 |
| | | | 711/158 |
| 2013/0304616 A1 | 11/2013 | Raleigh et al. | |
| 2014/0059544 A1 | 2/2014 | Koganty et al. | |
| 2014/0098671 A1* | 4/2014 | Raleigh | G06Q 20/40 |
| | | | 370/235 |
| 2014/0129719 A1 | 5/2014 | Weber et al. | |
| 2014/0372533 A1 | 12/2014 | Fu et al. | |
| 2015/0067171 A1 | 3/2015 | Yum et al. | |
| 2015/0312116 A1 | 10/2015 | Taheri et al. | |
| 2016/0218918 A1* | 7/2016 | Chu | H04L 41/5054 |
| 2016/0294728 A1 | 10/2016 | Jain et al. | |
| 2017/0257432 A1 | 9/2017 | Fu et al. | |

FOREIGN PATENT DOCUMENTS

| | | |
|---|---|---|
| CN | 103747059 A | 4/2014 |
| CN | 104123189 A | 10/2014 |
| EP | 3032412 A1 | 6/2016 |
| EP | 3278222 A1 | 2/2018 |
| WO | 2014066820 A2 | 5/2014 |
| WO | 2016161394 A1 | 10/2016 |

\* cited by examiner

PROVISIONING NETWORK SERVICES IN A SOFTWARE DEFINED DATA CENTER

CLAIM OF BENEFIT TO PRIOR APPLICATIONS

This application is a continuation application of U.S. patent application Ser. No. 14/834,979, filed Aug. 25, 2015, now published as U.S. Patent Publication 2016/0294728. U.S. patent application Ser. No. 14/834,979 claims the benefit of U.S. Provisional Patent Application 62/142,667, filed Apr. 3, 2015. U.S. Provisional Patent Application 62/142,667 and U.S. patent application Ser. No. 14/834,979, now published as U.S. Patent Publication 2016/0294728, are incorporated herein by reference.

BACKGROUND

Network services such as load balancer, firewall, IDS, IPS, encryption, decryption, are deployed today in the datacenter to provide a rich service oriented environment for applications and tenants. Typically these services are deployed at fixed points in the datacenter networking topology. Based upon configuration needs, the network services are provisioned to serve the various applications and tenants. As the demand increases and varies, the logistics of maintaining such static placement and provisioning methodology becomes challenging and leads to obfuscated and complex deployment involving hair-pinning traffic, choke point operation and complex configurations. The interdependencies across various apps and tenants often make the management of the network a mangled mess.

SUMMARY

Some embodiments of the inventions provide systems and methods for dynamic network service allocation that maps generic services into specific configurations of service resources in the network. In some embodiments, an application that is assigned to be performed by computing resources in the network is associated with a set of generic services, and the mapping of the set of generic services to the service resources is based on the assignment of the application to the computing resources. In some embodiments, the mapping of generic services is further based on a level of service that is chosen for the application, wherein different levels of services cause the set of generic services to be mapped to different sets of network resources.

The network manager in some embodiments allows the user to specify the required services as generic services without having to directly refer to or even knowing any of the underlying actual physical network resources. In some embodiments, generically specified services are part of a service template that specifies the services required by the application. The network manager processes the service template in order to dynamically allocate network resources for the required services. In some embodiments, the generic services in service templates are associated with individual application components of the application.

In some embodiments, an orchestration engine allocates a generic service to a dedicated resource or to a dedicated group of resources. In some embodiments, an orchestration engine can allocate a generically specified service using a set of criteria to dynamically identify the most suitable services. Such criteria in some embodiments allow the mapping of generic resources to be done dynamically based on real time status/metrics of the network such as topology, workload, or the location of the computing resources that are allocated to implement the application.

In some embodiments, a generically specified service can be mapped to different set of service resources by the orchestration engine according to different types of placement mapping. In some embodiments, different applications use different types of placement mappings. These different types of placement mapping can correspond to different levels of service, use of different service catalogues, and/or different dynamic conditions of the network.

Some embodiments tag an application component with the services that it requires. Regardless of where the application component is assigned (i.e., regardless of which computing resource the application component is assigned), its service tag follows the application component. When the application component is placed or assigned, the provisioning process would know to provision the network services at an appropriate service resource according to the service tag. In some embodiments, when the application is removed from the network, the network manager follows the service tags of the application to remove the services that are no longer necessary and free up service resources.

In some embodiments, a service catalogue specifies a set of permissible or available resources, and different service catalogues provide different alternative sets of actual service resources. In some embodiments, the orchestration engine uses a selected service catalogue to look up the most suitable placement mapping for a given generic service. In some embodiments, the service catalogue limits the placement mapping to only those allowed by the catalogue. In some embodiments, a set of catalogues represents a set of different levels of services, each catalogue specifying resources that are commensurate with its level of service, where a "higher level" of service entitles the application or its user preferential assignment in computing and service resources during placement.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
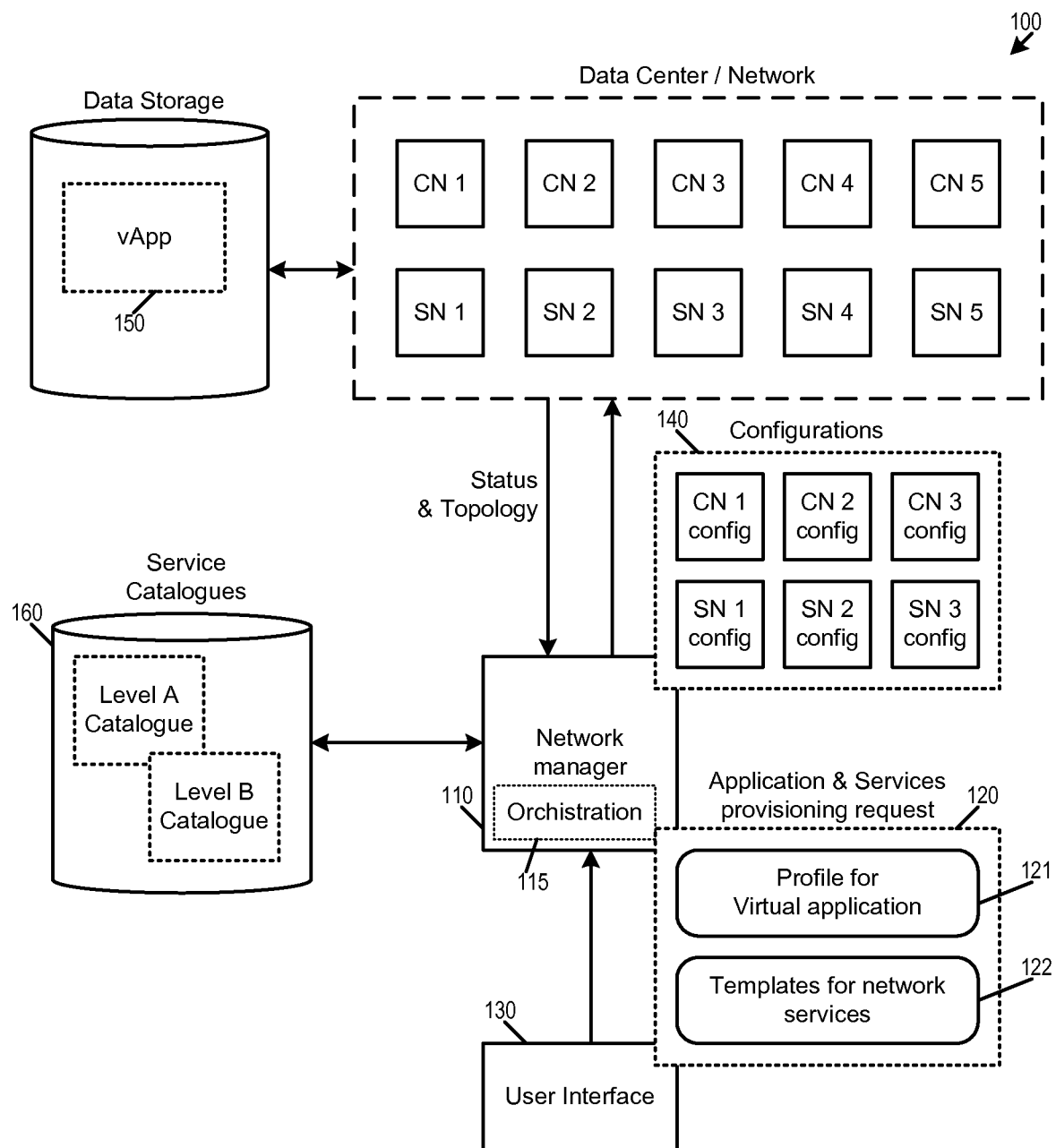
FIG. 1 illustrates a network manager that performs dynamic service placement for an application based on the application's service templates.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the inventions provide systems and methods for dynamic network service allocation that maps generic services into specific configurations of service resources in the network. In some embodiments, an application that is assigned to be performed by computing resources in the network is associated with a set of generic services, and the mapping of the set of generic services to the service resources is based on the assignment of the application to the computing resources. In some embodiments, the mapping of generic services is further based on a level of service that is chosen for the application, wherein different levels of services cause the set of generic services to be mapped to different sets of network resources.

The invention promotes proper and deterministic scale and resource utilization and reduces the entropy of reconfiguring an existing service and/or introducing a new service. It makes the placement and the configuration of the network services more dynamic and simplistic in order to flexibly meet the ever changing demand and requirements of virtualized applications.

Several more detailed embodiments of the invention are described below. Section I describes the allocation of network resources to applications and associated generic services. Section II discusses different types of service resources that are available in a datacenter with host machines that operates virtualization software. Section III describes an example computing device that serve as a host machine of VMs. Finally, section IV describes an electronic system with which some embodiments of the invention are implemented.

I. Dynamic Placement of Services

Some embodiments performs dynamic service placement when provisioning an application in a network (i.e., assigning network resources to perform the application). An example of such an application is a VMware® vApp®, which is a collection of virtual machines (VMs) and sometimes other vApps that host a multi-tier application, its policies and service levels. In some embodiments, dynamic service placement is performed by an orchestration engine of a network manager that is responsible for managing and configuring the resources of the network.

As the performance (i.e., execution) of the application requires services for the application such as edge services, load balancing, firewall, Dynamic Host Configuration Protocol (DHCP), virtual private network (VPN), network address translation (NAT), etc., the network manager in some embodiments allows the user to specify the required services as generic services without having to directly refer to or even knowing any of the underlying actual physical network resources. A generically specified service is therefore an abstraction of the underlying actual physical network resources for implementing the service. In some embodiments, generically specified services are part of a service template that specifies the services required by the application. The network manager processes the service template in order to dynamically allocate network resources for the required services.

FIG. 1 illustrates a network manager 110 that performs dynamic service placement for an application based on the application's service templates. As illustrated, the network manager 110 manages the network of a datacenter 100. The datacenter 100 provides an array of network resources that can serve as computing resources/nodes (illustrated as CNs) and/or service resources/nodes (illustrated as SNs). The network manager 110 receives a provisioning request 120 from a user interface 130 for deploying an application 150 in the datacenter network 100. The network manager 110 in turn provisions the application by producing configurations 140 to configure the various resources of the network 100.

In some embodiments, a datacenter can simultaneously support many applications from one or many different tenants. The applications from these tenants use different resources in the network but also share some of the resources in the network. The network manager 110 in some embodiments identifies the most suitable resources in the datacenter for each of these applications and their associated services based user input (e.g., from user interface 130) and a set of predetermined service catalogues 160. In some embodiments, the user interface 130 is provided by the network manager 110 in order to facilitate the authoring of the provisioning request.

As illustrated, the network manager 110 generates the configurations 140 according to the received provisioning request 120. The provisioning request 120 includes an application profile 121 for the application 150. The provisioning request 120 also includes a service template 122 for specifying network services that are needed for performing (i.e., executing) the application 150. The application profile 121 provides information regarding the application that is to be performed by the resources (computing resources in particular) of the network 100. In some embodiments, an application comprises several components that can be assigned to different computing nodes, where each component requires its own set of network services. In some embodiments, the different components of the applications are different layers of the application. For example, in some embodiments, an application is a multi-tier application that has a web layer, an application layer, and a database layer. Each layer has its own requirement for network services. The service template 122 of the application in turn describes the service requirements for each of the different layers/components.

The service template 122 includes parameters that generically specify the services required by the application 150 in generic, abstract terms that do not refer to specific network resources (also referred to as generic services). For example, in some embodiments, a service template can generically specify firewalls that allow only certain types of traffic to flow in or out of the application, load balancing that balances traffic to a particular component or layer of the application, dynamic DHCP service for a particular component or layer of the application, or encrypting data out of the application, without referring to actual network resources. The network manager 110 in turn translates these generic services in the service template 122 into the configurations 140 for configuring the resources in the network 100. The generated configurations 140 are specific to the actual physical computing or service resources in the network 100.

The network manager 110 includes an orchestration engine 115 for mapping the application profile 121 and the service template 122 to the configurations 140. The orchestration engine 116 identifies the most suitable service resources for implementing services that are required by an application. For the generically specified services in the service template 122, the orchestration engine maps them to actual service resources having actual network addresses. For example, the orchestration engine 116 in some embodiments would map a specification for a DHCP service to a DHCP server provided by an edge router.

In some embodiments, the orchestration engine 160 determines the most suitable placement of the application and the required services based on the current network topology (e.g., relative position of various network resources, logically or physically) and/or the current network status or metrics (e.g., work load of various network resources) and dynamically allocates computing and service resources accordingly. The orchestration engine 160 then generates the corresponding configurations 140 for those allocated network resources.

In some embodiments, the generic services in the service template 122 are associated with individual application components of the vApp so the mapping of the generic services is determined in part based on the placement of the individual application components. For example, once a particular application component is assigned to a particular computing resource (or a group of computing resources), the network manager would map the component's associated generic services to service resources that are properly positioned in relation to the particular computing resource in order to serve as points of enforcement for those associated generic services.

As illustrated, the network manager 110 performs placement of the application and its required services based on the set of service catalogues 160. In some embodiments, different service catalogues provide different alternative sets of actual service resources for mapping to the orchestration engine 115. In some embodiments, a generic service specification in the service template 122 may refer to one of the service catalogues so the orchestration engine would know to use network resources made available by the particular service catalogue. Service catalogues will be further described by reference to FIG. 5 below.

Figure 2:
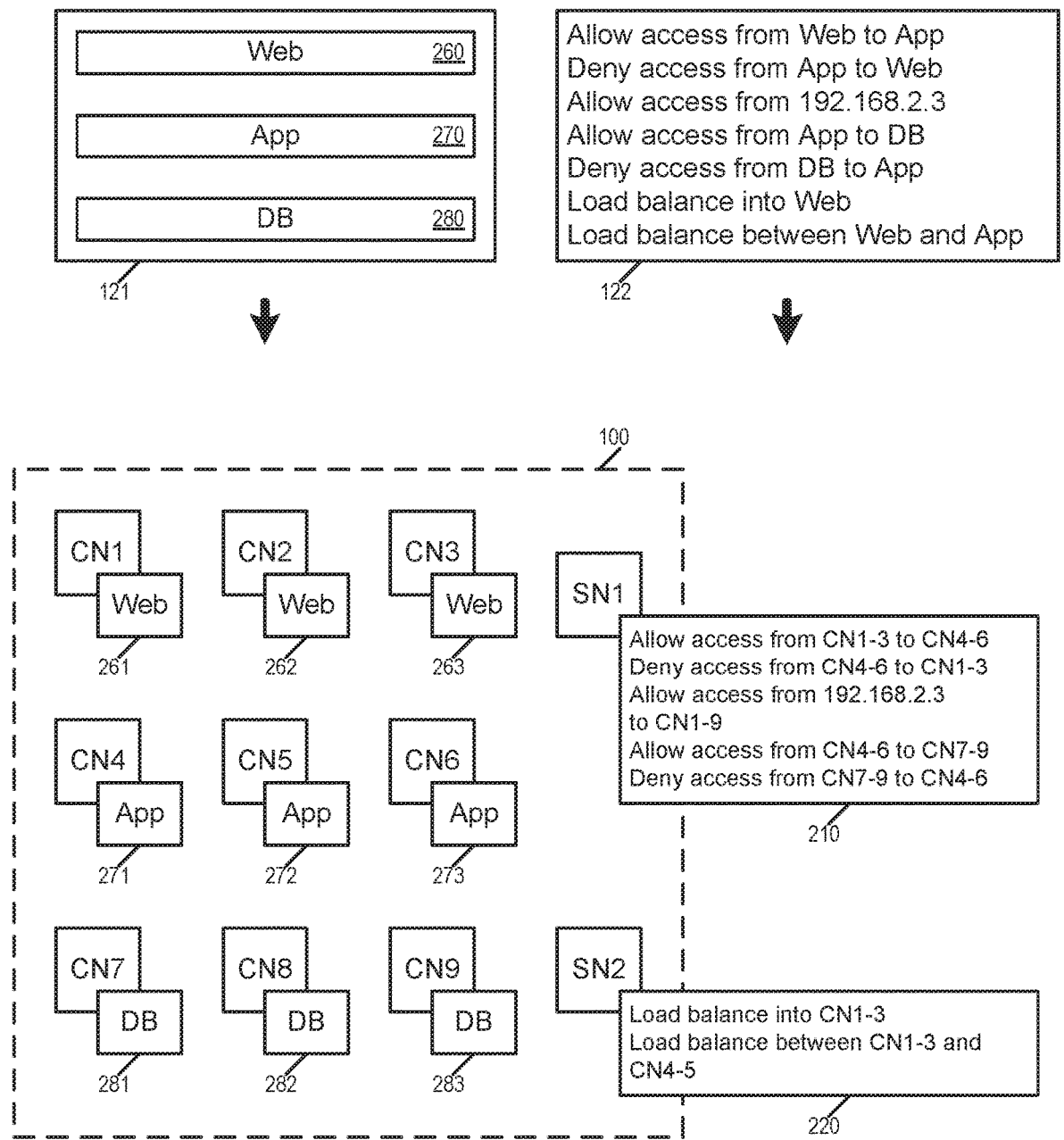
FIG. 2 illustrates the mapping from generically specified services in a service template to actual network service resources in a network.

FIG. 2 illustrates the mapping from generically specified services in the template 122 to actual network service resources in the network 100 for the application 150. As illustrated, the application profile 121 of the application 150 specifies that the application 150 includes a web layer 260, an app layer 270, and a database (DB) layer 280. The service template 122 in turn specifies several security policies in terms of abstract generic services relative to those layers of the application 150. For example, the service template 122 includes generic services "allow access from Web to App" and "deny access from App to Web". The service template 122 also includes generic services "load balance traffic into Web" and "load balance traffic between web and app".

In some embodiments, a service template may also include explicit direct specification of network services. For example, in addition to the generically specified services, the service template 122 also includes explicit network services specifications, such as "allow access for 192.168.2.3".

The service template 122 includes policies that specify the access control services as well as the load balancing services for traffic in and out of Web and App layers in generic terms without specifying the actual network resources. The orchestration engine would then maps those generic terms with identifiers, address, and rules that reference actual network resources.

FIG. 2 also illustrates the state of the network 100 after the application 150 is provisioned and the set of generic services in the service template 122 is implemented. As illustrated, the layers of the application 150 are implemented in computing resources of the network 100. Specifically, the Web layer of the application 150 is implemented by compute resources CN1, CN2, and CN3 (as instances or components 261-263), the App layer of the application 150 is implemented by compute resources CN4, CN5, and CN6 (as instances or components 271-273), and the DB layer is implemented by compute resources CN7, CN8, and CN9 (as instances or components 281-283). The set of generic services in the profile 122 are mapped to service resources SN1 and SN2 of the network 100. In this example, SN1 implements services regarding access controls for traffic in and out of CN1-9, while SN2 implements services regarding load balancing of traffic in and out of the CN1-9.

The example of FIG. 2 illustrates the mapping of the service specifications in the services template 122 by the orchestration engine 115 based on the compute resource allocation of the application components. The services template 122 is mapped to configuration data 210 for the SN1 and configuration data 220 for SN2. As illustrated, the generic terms in the services template 122 are mapped to identifiers, address, and rules that reference actual network resources in the network 100. For example, the generic service "allow access from Web to App" is mapped to "allow access from CN1-3 to CN4-6" in SN1, since the Web layer is implemented in CN1-3 and the App layer is implemented in CN4-6. Likewise the generic service "load balance between Web and App" is mapped to "load balance between CN1-3 and CN4-6". Though this example uses the labels "CN1-9" or "SN1-2" to refer to the computing and service resources, one of ordinary skill would understand that, in some embodiments, these labels represent the actual addresses (e.g., IP address or MAC address) of the labeled computing resources, and the services that refer to those labels are specifying the addresses of the labeled resources (such as access control or firewall rules that are applicable to those addresses). In some embodiments, each of these labels represents a dynamic grouping of actual addresses (referred to as a container or a security group) so a service that refers to such a label is specifying the dynamic grouping of addresses.

Figure 3:
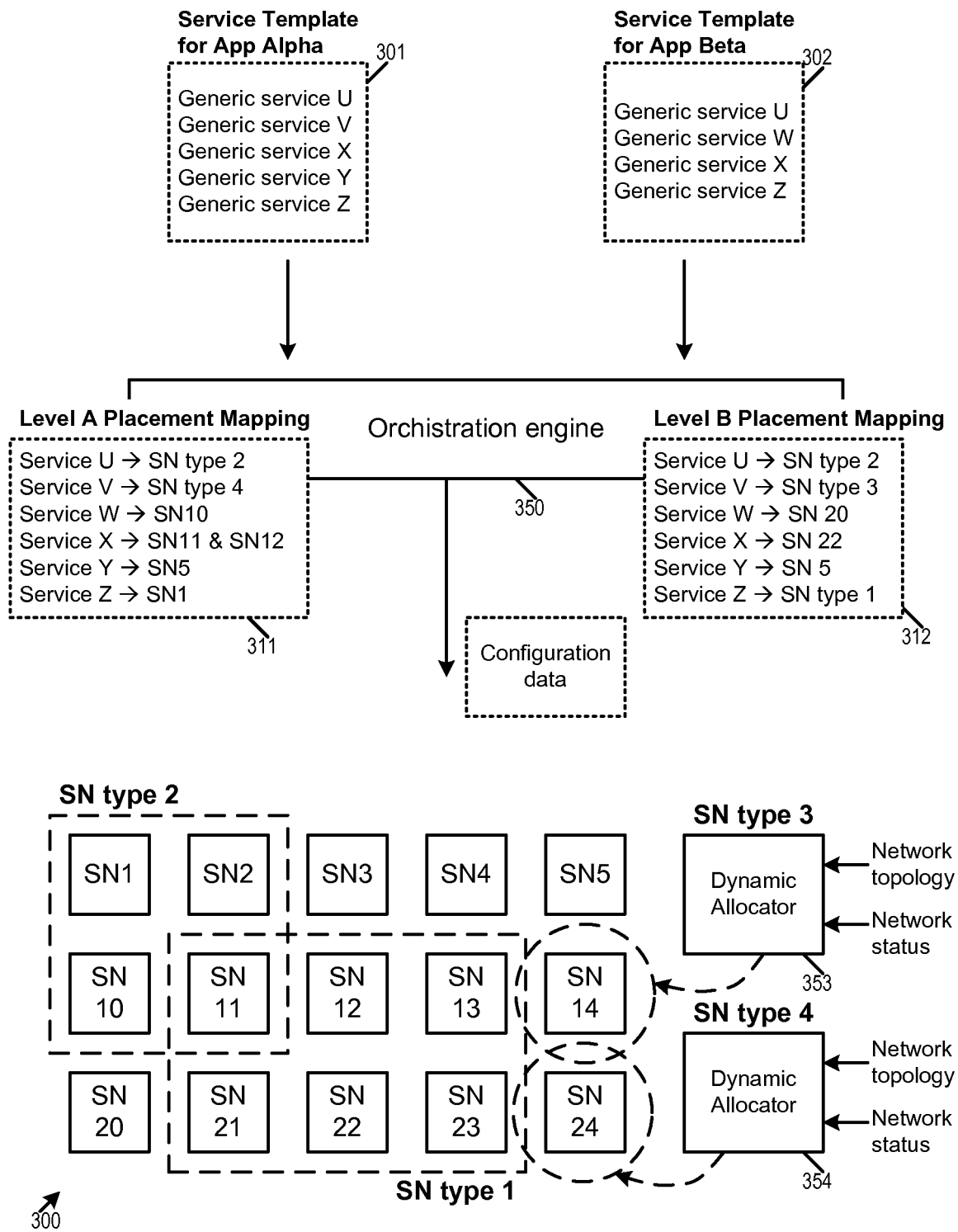
FIG. 3 illustrates different types of mappings that an orchestration engine can perform when allocating generically specified services into a network.

FIG. 3 illustrates different types of mappings that an orchestration engine 350 can perform when allocating generically specified services into a network 300. In some embodiments, an orchestration engine can allocate a generic service to a dedicated resource or to a dedicated group of resources. In some embodiments, an orchestration engine can allocate a generically specified service using a set of criteria to dynamically identify the most suitable services.

Such criteria in some embodiments allow the mapping of generic resources to be done dynamically based on real time status/metrics of the network such as topology, workload, or the location of the computing resources that are allocated to implement the application.

In some embodiments, a generically specified service can be mapped to different set of service resources by the orchestration engine according to different types of placement mapping. In some embodiments, different applications (or a same application by different tenants of the datacenter) use different types of placement mappings. These different types of placement mapping can correspond to different levels of service, use of different service catalogues, and/or different dynamic conditions of the network. For example, in some embodiments, a generic service having a higher level of service would be mapped to faster resources or reserved resources, while a generic service that corresponds to a lower level of service would simply be mapped to any available resource. In some embodiments, each tenant of the datacenter pays for its own level of service and is mapped accordingly by the orchestration engine.

FIG. 3 illustrates two example service templates 301 and 302 having generically specified services for two different applications that are to be provisioned into the network 300. The network 300 includes service resources (or service nodes) SN1 through SN24. The services template 301 is mapped by the orchestration engine according to a placement mapping 311 and the service template 302 is mapped by the orchestration engine 350 according to a placement mapping 312.

The service template 301 generically specifies its required services U, V, X, Y, and Z. The services template 302 generically specifies its required services U, W, X, and Z. Both the placement mappings 311 and 312 provides mapping for generic services U, V, W, X, Y, and Z, but as illustrated in the figure they map these generic services differently. For example, (the orchestration engine 350 when using) the placement mapping 311 maps generic service W to SN 10, while the placement mapping 312 maps generic service W to SN 20. Some services are mapped to the same set of resources. For example, both the placement mapping 311 and the placement mapping 312 map the service Y to the resource SN5. In some embodiments, a placement mapping can (be used by the orchestration engine to) map a generic service to more than one network resource. For example, the placement mapping 311 maps the service X to SN11 and SN12.

In some embodiments, a generic service is mapped to a type of service resources. For example the service U is mapped to a service resource type "2" by both the placement mappings 311 and 312, while the service V is mapped to a service resource type "3" by the placement mapping 312. In some embodiments, a service resource type can be a designation for a specific group of service resources. For example, the service resource type "2" corresponds to service nodes SN1, SN2, SN10, and SN11, while the service resource type "1 corresponds to service nodes SN11, SN12, SN13, SN21, SN22, and SN23.

In some embodiments, a service resource type can correspond to a set of criteria that is used to dynamically identify network resources to provision the requested services. In some embodiments, the orchestration engine has processes that perform these types of dynamic allocations. For example, both service resource types "3" and "4" correspond to dynamic allocators 353 and 354 in the orchestration engine 350 that use real-time network information to select network resources for provisioning the requested services. In the illustrated example, the dynamic allocator 353 for service resource type "3" has selected SN14 for application 302 based on the current network status or metrics, while the dynamic allocator 354 service resource type "4" has selected SN24 based on current network status. Such dynamic allocation can be the workload of the various network resources (e.g., to identify a resource that is the most idle), or based on network topology (e.g., identify the service resource that is at the best position for enforcing certain security policies based on the configuration of the computing resources.)

In some embodiments, the different service resource types correspond to different level of services. In other words, some higher level service resource types are free to use more "preferred" or even reserved service resources than some lower level service resource types. In some of these embodiments, a dynamic allocator for a higher level service would enjoy higher priority in resource allocation than a dynamic allocator for a lower level service. In some embodiments, a higher level service template uses higher level resource types while a lower level service template uses lower level resource types.

As mentioned, in some embodiments, the dynamic allocation of services depends on how the application (and its components) is provisioned, i.e., how and where do the various components/instances/layers/sections of the application are placed in the network. In some embodiments, each component of an application requires its own set of service resources. For example, in FIG. 2, the web layer 260 of the application 150 requires an access control service to deny access from the app layer 270 as well as a load balancing service to balance incoming traffic from the App layer 270. Some embodiments therefore tag an application component (e.g., a layer) with the services that it requires. Regardless of where the application component is assigned (i.e., regardless of which computing resource the application component is assigned), its service tag follows the application component. When the application component is placed or assigned, the provisioning process (e.g., the network manager or the orchestration engine) would know to provision the network services at an appropriate service resource according to the service tag. In some embodiments, when the application is removed from the network, the network manager follows the service tags of the application to remove the services that are no longer necessary and free up service resources.

Figure 4:
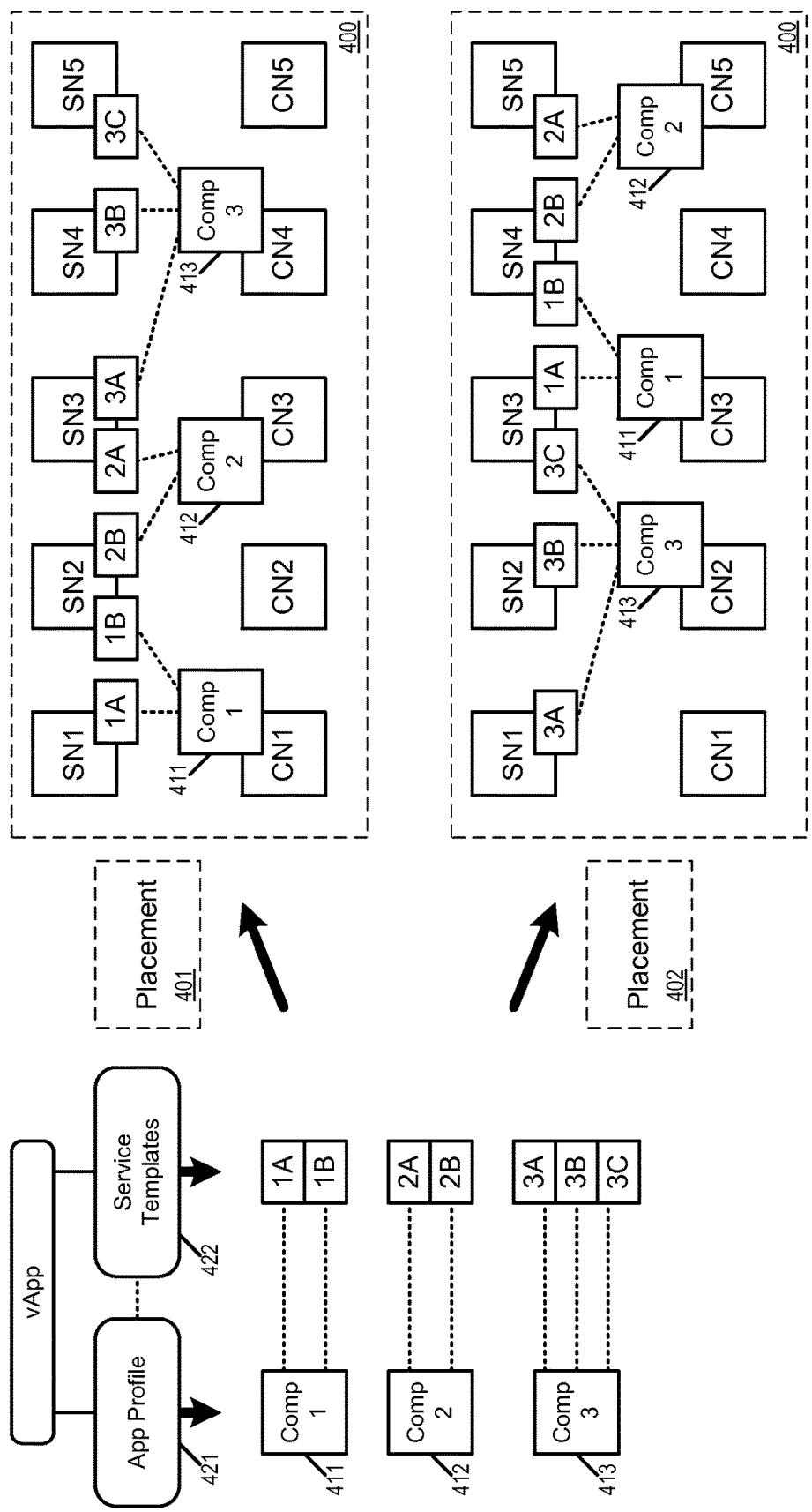
FIG. 4 conceptually illustrates the provisioning of services based on tags that associate application components with their required services.

FIG. 4 conceptually illustrates the provisioning of services based on tags that associate application components with their required services. The provisioning is for implementing an application 410 into a datacenter 400 having computing resources CN1 through CN5 and service resources SN1 through SN5. The application 410 is to be provisioned by using an application specification 421 and a services specification 422.

According to the application specification 421, the application 410 has three components 411-413 (application components 1, 2, and 3). The services specification 422 in turn specifies the network services required by each of these application components. Specifically, the component 411 requires services 1A and 1B, the component 412 requires services 2A and 2B, and the component 413 requires services 3A, 3B, and 3C. Consequently, the application component 411 is tagged with generic services 1A and 1B, the application component is tagged with generic services 2A and 2B, and the application component is tagged with generic services 3A, 3B, and 3C. These tags would follow their corresponding application component and be provisioned accordingly.

FIG. 4 illustrates two different placements 401 and 402 of the application components 411-413. In some embodiments, the placement of application components is based on level of service subscribed, level of computing performance required, availability or workload of computing resources, identity of tenant, topology of the network, and other information that are available to the placement engine (e.g., the network manager 110). For example, in some embodiments, each application component is placed within certain forwarding hops of a network resource of a particular performance capability. A higher level service would place the application component within fewer forwarding hops of a faster performing network resource, while a lower level service may place the application component at greater number of forwarding hops away from the network resource, or assigned to be served by a slower performing network resource.

According to the first placement 401, the application component 411 is placed at (i.e., assigned to be performed by) compute resource CN1, the application component 412 is placed at compute resource CN2, and the application component 413 is placed at compute resource CN3. According to the second placement 402, the application component 411 is placed at compute resource CN3, the application component 412 is placed at compute resource CN5, while the application component 413 is placed at the compute resource CN2.

The figure also illustrates the placement of services that are associated with the application components according to the tags. In some embodiments, the service tags of an application component allows the provisioning process to identify the most suitable service resource for implementing the tagged services based on the placement of the application component. For example, according to placement 401, the application component 411 is placed at CN1, and its tagged services 1A and 1B are correspondingly placed at nearby resources SN1 and SN2. (In this figure, a SN that is more suitable than another SN for implementing a required service for an application component placed at a particular CN is conceptually illustrated as closer to the particular CN than the other SN.) However, when the application component 411 is placed at CN3 according to placement 402, its tagged services 1A and 1B are placed at SN3 and SN4 instead, as these service resources are the more suitable for CN3 rather than SN1 and SN2. In other words, the service tags of an application component allows application component to have its required services be implemented at the most suitable service resources based on the placement of the application component. What constitutes a more "suitable" resource will be further described below in Section II.

In some embodiments, the placement mapping used by an orchestration engine is based on a service catalogue that has been selected for that service or that application. As mentioned, in some embodiments, a service catalogue specifies a set of permissible or available resources, and different service catalogues provide different alternative sets of actual service resources. In some embodiments, the orchestration engine uses the selected service catalogue to look up the most suitable placement mapping for a given generic service. In some embodiments, the service catalogue limits the placement mapping to only those allowed by the catalogue.

In some embodiments, a set of catalogues represents a set of different levels of services, each catalogue specifying resources that are commensurate with its level of service, where a "higher level" of service entitles the application or its user preferential assignment (e.g., having higher priority, having more feature sets to choose from, being assigned to use higher performing resource, or being placed closer to the assigned resource) in computing and service resources during placement. In some embodiments, each tenant of the datacenter selects a service catalogue that corresponds to its (paid for) level of service, e.g., as default. In some embodiments, each application selects a service catalogue. In some embodiments, each service template for a particular component of the application selects and uses a service catalogue. In some embodiments, a service template can have different service catalogues selected for different generic services.

Figure 5:
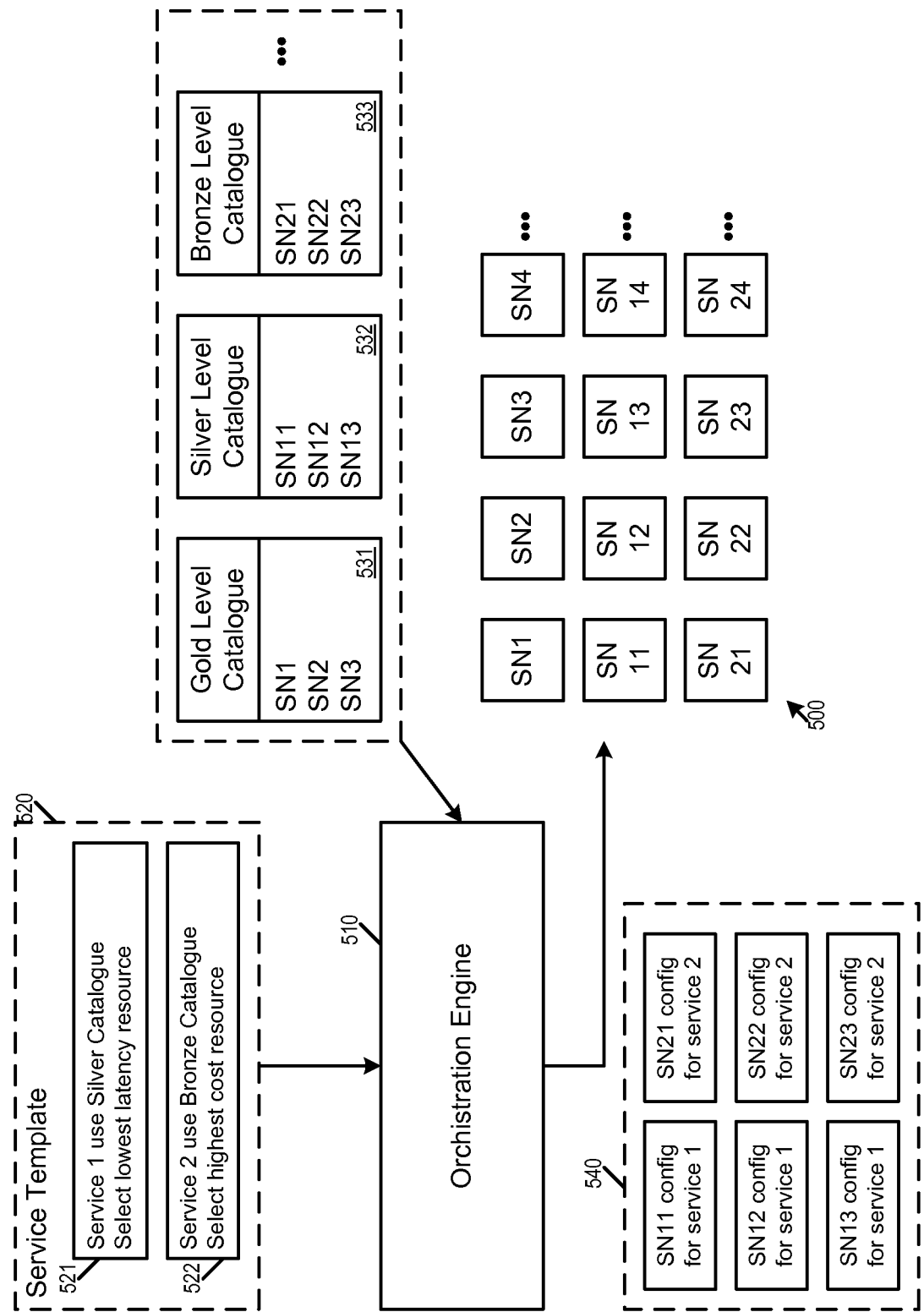
FIG. 5 illustrates a datacenter that uses service catalogues for placement mapping.

FIG. 5 illustrates a datacenter 500 that uses service catalogues for placement mapping. The datacenter 500 has service resources SN1 through SN24 and an orchestration engine 510 performs placement mapping for services. The orchestration engine 510 can select from a set of service catalogues 531-533, respectively corresponding to "Gold", "Silver", and "Bronze" levels of services. The "Gold" catalogue allows the use of the service resources SN1, SN2, and SN3. The "Silver" catalogue" allows the use of the service resources SN11, SN12, and SN13. The "Bronze" catalogue allows the use of the service resources SN21, SN22, and SN23. In some embodiments, the different catalogues are updated by the orchestration engine to make sure that the most suitable resources are provided for each service level according to the most up to date network topologies or metrics.

The orchestration engine 510 receives a service template 520 for an application (or an application component) that specifies a generic service 521 ("service 1") and a generic service 522 ("service 2"). As illustrated, the service 521 specifies that it is using the "Silver catalogue", while the service 522 specifies that it is using the "Bronze" catalogue. Each catalogue identifies a set of resources that are eligible to be used by the application according to the level of service (Gold/Silver/Bronze, etc.). Each service also specifies a set of criteria for selecting the most suitable resources from among the eligible resources. In some embodiments, these criteria are based on random, workflow, topology, latency, cost, etc. In this example, the service 521 specifies that it should select the lowest latency resource from the eligible resources, while the service 522 specifies that it should select the lowest cost resource from the eligible resources.

The orchestration engine in turn creates a set of configuration data 540 by performing placement mapping based on the selected catalogues. Specifically, the service resources SN11, SN12, SN13 are configured to perform the service 521 ("service 1") as these are the resources provided by the "Silver" catalogue, and the service resources SN21, SN22, and SN23 are configured to perform the service 522 ("service 2") as these are the resources provided by the "Bronze" catalogue.

Figure 6:
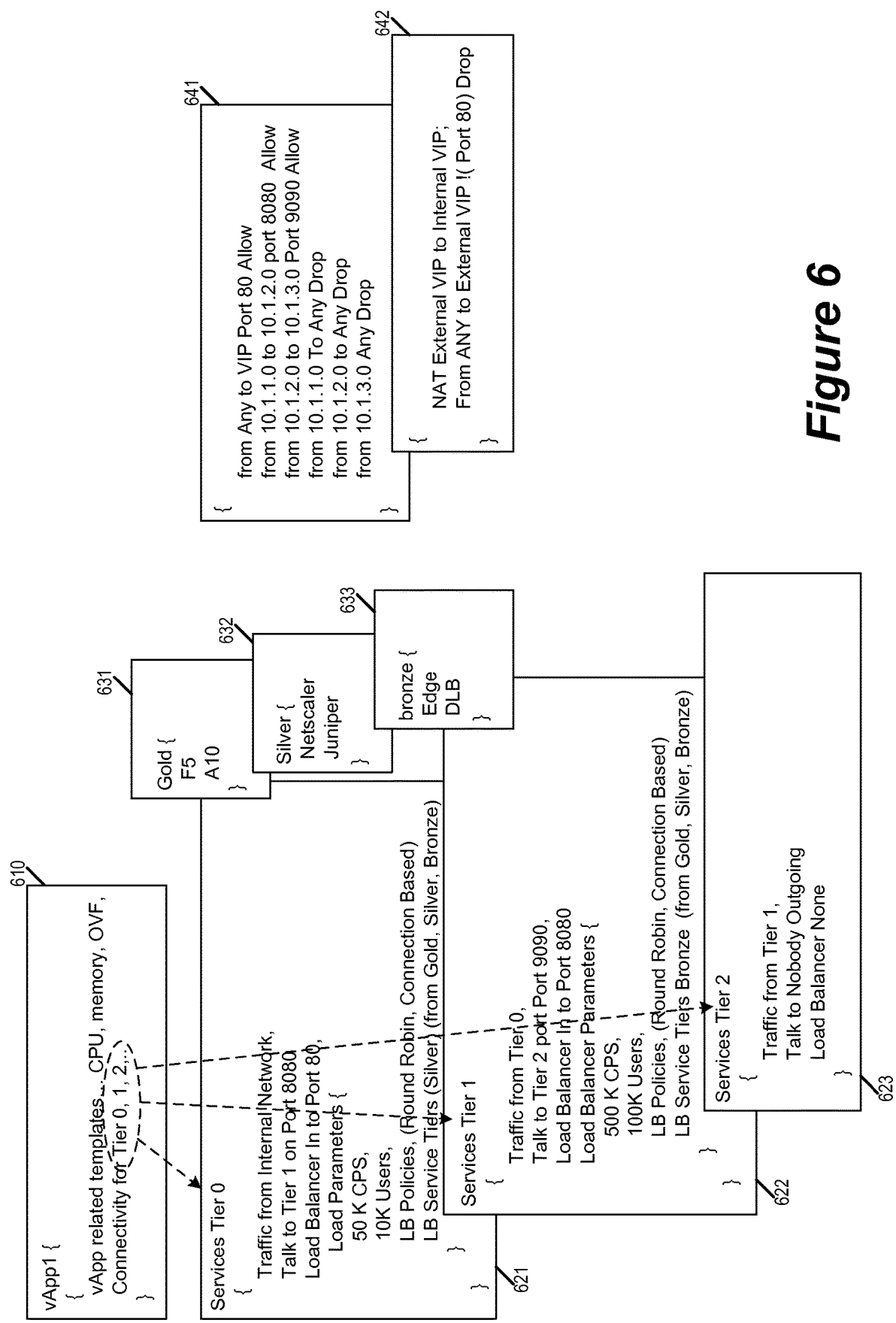
FIG. 6 illustrates another example of using service templates and service catalogues to provision services for an application.

FIG. 6 illustrates another example of using service templates and service catalogues to provision services for an application. In order to provision an application 600 in a datacenter, the orchestration engine of the data center receives an application profile 610 that specifies three different layers or tiers (Tier 0, Tier 1, and Tier 2). The orchestration engine also receives a set of service templates 621-623 for the different tier of the application 600, the service template 621 specifying the services for application tier 0, the service template 622 specifying the services for application tier 1, and the service template 623 specifying the services for application tier 2. Each tier's service template includes generically specified rules or services that do not address actual resources in the network. The orchestration engine uses service catalogues 631-633 that corresponds to different levels of services ("Gold", "Silver", and "Bronze"), each catalogue specifying a set of service resources commensurate with its level of service.

The orchestration engine takes the application profile 610, the service templates 621-623, the service catalogues 631-633, and a set of network metrics (not illustrated) to create a configuration 641 that refers to actual addresses and configures actual service resources. The configuration 641 is for deploying the following services:

(1) a network edge service that is reachable by 3 networks 10.1.1.0, 10.1.2.0, and 10.1.3.0, the three individual tiers (Tier 0, Tier 1, Tier 2) being on those three networks, Tier 0 having internal (to the datacenter) reachability and advertising only to 10.1.1.0 network; and (2) a load balancer (Silver category from the catalogue, wherein the individual category may have many options) on for the Tier 0 traffic with the parameters mentioned. The IP address of the load balancer is taken as the Virtual IP (VIP).

The set of policies 641 specifies forwarding rules on the edge service node so that traffic from Tier 1 can only go to Tier 2, and Tier 2 to Tier 3. As the policies state that Tier 1 receives traffic from only Tier 0, it deploys a Distributed Load Balancer (DLB, which may be part of the "Bronze" service catalogue 633) on traffic from Tier 0 to serve traffic to port 8080, (if the user of the application 600 would have specified, say "Silver", some other load balancer would have gotten deployed and configured). The DLB can be used to redirect all port 8080 traffic from Tier 0 to any IP addresses in the Tier 1. Since the application 600 is an vAPP, its internal App IP address need not change. The same is true for when the DLB is used for redirecting traffic to the Tier 1 VIP (in case of deployment according to "Silver" service catalogue). No service is deployed between Tier 1 and Tier 2 as none is requested (Apart from the forwarding rules).

If the user changes the Tier 0 service template 621 from internal to external, the following changes happen automatically: An external VIP is allocated; A network address translation (NAT) policy is introduced to the edge service node according to configuration 642. These created configurations (e.g., 641 and 642) are tagged to the application 600. When the application 600 is removed, the configurations 641 and 642 from all the nodes would also be removed by following the tags.

Though not illustrated, based upon the service offerings according to service catalogues 631-633 for "Gold", "Silver", and "Bronze". The orchestrator can also provisions services through other service mechanisms and make those other service mechanism available for mapping by populating and providing additional service catalogues for the service templates to select.

Figure 7:
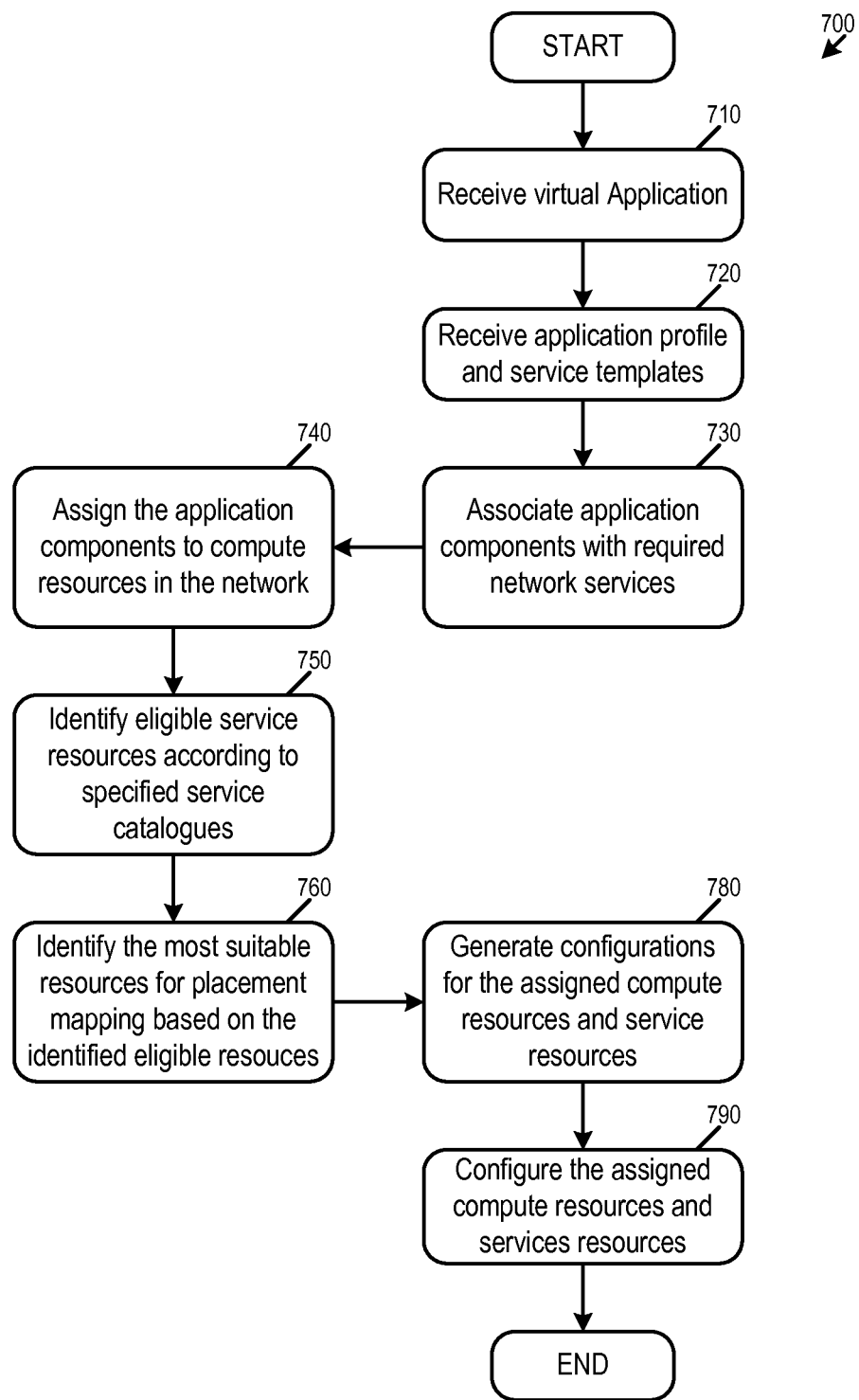
FIG. 7 conceptually illustrates a process for provisioning network services for an application.

FIG. 7 conceptually illustrates a process 700 for provisioning network services for an application based on some embodiments of the invention. The process 700 is performed by a network manager such as 110 (or its orchestration engine) in some embodiments. The process 710 starts when it receives a command to provision a virtual application in a data center. In some embodiments, the process starts when a user or a tenant of a datacenter requests the network manager to provision an application (i.e., a vApp), or if the network manager has determined that the network resources needs to be reallocated (for e.g., efficiency or for failure recovery reasons).

The process then receives (at 720) an application profile and its associated service templates. In some embodiments, an application is divided into several sections or components when being provisioned into computing resources of the datacenter. The application profile specifies how the application is to be provisioned, e.g., by layers/tiers/components. The service templates specify the network services that are required by the application. In some embodiments, each layer of the application has its own corresponding service template that specifies the services required by the layer. In some embodiments, a service template specifies some of the required services in abstract general terms that do not refer to specific actual network resources. These generically specified services are thus free to be placement mapped to the most suitable resource by the orchestration engine.

Next, the process associates (at 730) application components with the required network services. Some embodiments identify the services required by each component of the application and associate the application component with those identified services. To associate an application component with its required services, some embodiments provide tags that link the required services with the application component. The tags also allow required services that are specified in generic terms (generic services) to be able to follow the application component and be placed at the most suitable service resources. The process then assigns (at 740) the virtual application components to compute nodes in the network. Examples of placement of application components can be found in U.S. patent application Ser. No. 14/284,286, titled "Automatic Placement of Clients in a Distributed Computer System Based on at least Physical Network Topology Information". In some embodiments, the placement of the application components at least partially determines the placement of the associated network services.

Next, the process identifies (750) the service resources that are eligible for implementing the required service. In some embodiments, the eligible resources are determined by the service catalogues that are selected for those required services. In some embodiments, a service template refers to service catalogues to limit placement mapping to a particular class or type of service resources, which in some embodiments corresponds to a level of service. In some embodiments, for generic services that do not refer to a service catalogue, the process considers all service resources in the network as eligible for placement mapping. The use of service catalogues for identifying service resources is described by reference to FIGS. 5 and 6 above.

The process then identifies (760) the most suitable resources for placement mapping the generic services based on the identified eligible service resources. This operation allows the generic service requirements to be converted to actual service resources. In some embodiments, for each service, the process identifies from among the eligible resources a most suitable resource based on random, topology, latency, cost, etc. As mentioned, in some embodiments, the service catalogues provide the eligible resources, while the service templates provide the criteria for identifying the most suitable resources from among the eligible resources. In some embodiments, the placement of service resources is also based on the service tags that link the application components with its required services, as the process uses the service tags of the application component to place the required services in the most suitable service resource from the perspective of the placed application component. Placement based on service tags is described by reference to FIG. 4 above.

Based on the placement of the application components and the required services, the process generates (at 780) configuration data for the assigned compute and service resources. The process then configures (at 790) the assigned compute resources and service resources by delivering their corresponding configuration data. The process 700 then ends.

II. Service Resources in a Datacenter

Section I above generically refers to datacenter resources that perform computation for applications as "computing resources" or "compute nodes" and resources that perform services for application components as "service resources" or "service nodes". In some embodiments, these network resources are implemented by computing devices (i.e., host machines) that operate virtualization software as well as physical routers and switches that do not implement virtualization software.

Figure 8:
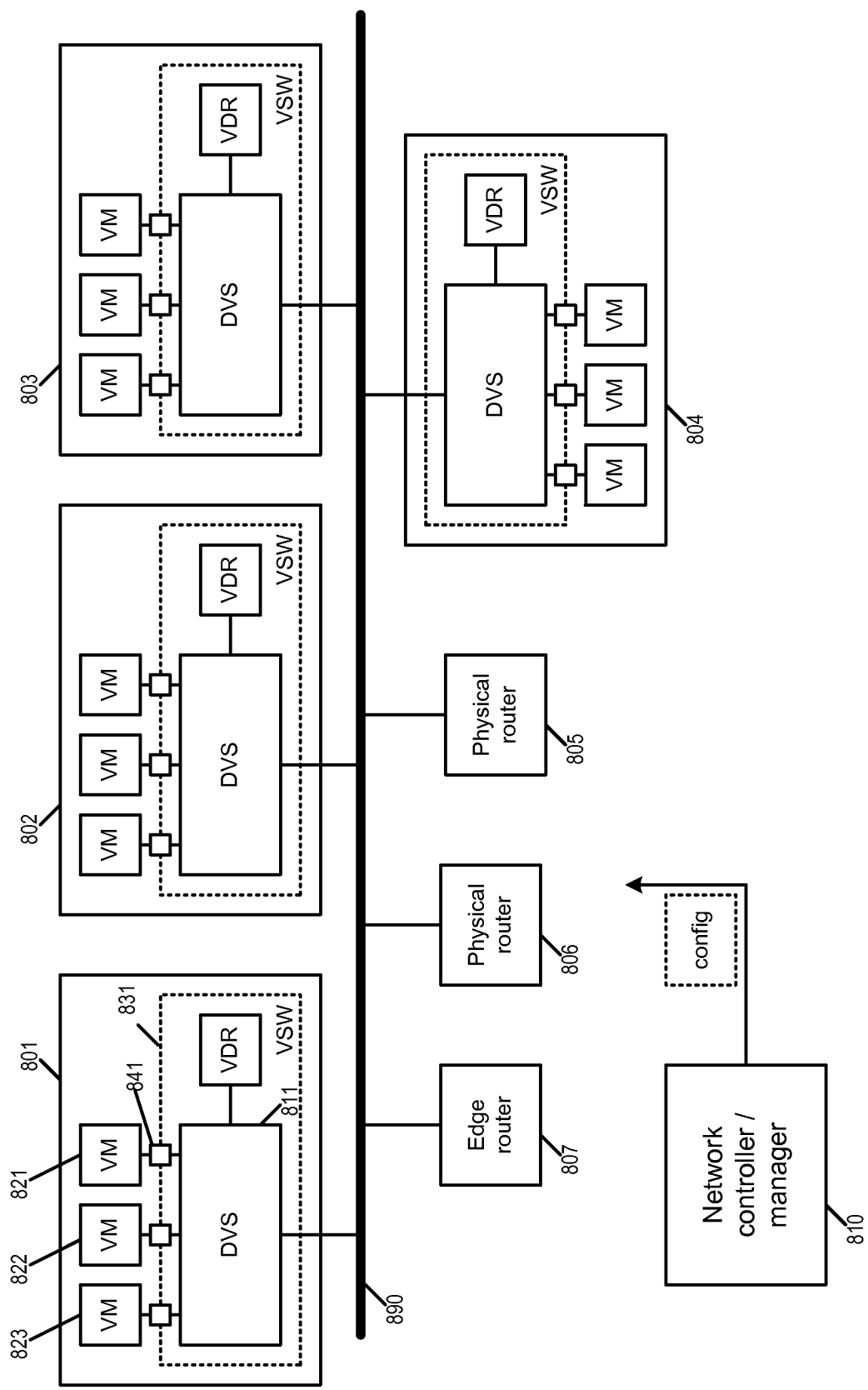
FIG. 8 illustrates the network resources of a datacenter that serve as computing resources and/or service resources.

FIG. 8 illustrates the network resources of a datacenter 800 that serve as computing resources and/or service resources that are referred to in Section I. The datacenter has a network manager 810 for receiving requests to provision applications and generating the corresponding configuration data for configuring computing resources and service resources in the data center. The datacenter 800 includes host machines 801-804 as well as physical routers 805-806 to serve as the computing resources and service resources. The host machines 801-804 and physical routers 805-806 are interconnected by a physical network 890.

As illustrated, each host machine is running virtualization software (VSW) that allows it to host one or more virtual machines (VMs). The virtualization software manages the operations of the VMs as well as their access to the computing resources and the network resources of the host machines. In some embodiments, the virtualization software provides an interface between each VM and a logical switch supported by the underlying network. Virtualization software may include one or more software components and/or layers, possibly including one or more of the software components known in the field of virtual machine technology as virtual machine monitors (VMMs), hypervisors, or virtualization kernels. Because virtualization terminology has evolved over time and has not yet become fully standardized, these terms do not always provide clear distinctions between the software layers and components to which they refer. As used herein, the term, "hypervisor" is intended to generically refer to a software layer or component logically interposed between a virtual machine and the host platform. Computing devices that serve as host machines will be further described in Section III below. The host machine 801, for example, is operating VSW 831 and hosting VMs 821-823.

As illustrated, the virtualization software of each host machine 801-804 is running a distributed virtual switch (DVS) and a virtual distributed router (VDR). In some embodiment, these are also referred to as managed forwarding elements (MFEs) as they are software defined and managed for performing L2 and L3 packet forwarding operations. In some embodiments, the DVS instances operating in different host machines jointly operate as one logical switching element (LSE), where each local DVS instance operate as a managed physical switching element (MPSE) at its host machine (e.g., the local DVS instance 811 is the MPSE of the host machine 801). In some embodiments, the VDR instances running in different host machines jointly operate as one logical routing element (LRE), where each local VDR instance operate as a managed physical routing element (MPRE) for performing L3 routing at its host machine. In some embodiments, some of the VDRs also provide bridging functions. Further descriptions of virtualization software that operate managed forwarding elements can be found in U.S. patent application Ser. No. 14/137,862, titled "Logical Router", U.S. patent application Ser. No. 14/503,164, titled "Virtual Distributed Bridging", and U.S. patent application Ser. No. 14/227,959, titled "Ingress ECMP in Virtual Distributed Routing Environment". In some embodiments, these managed forwarding elements serve as service resources that can be selected to implement the required network services (generically specified or otherwise). In some embodiments, the virtualization software can also be configured to implement network services at other points of enforcements, such as at DVS ports that connect VMs and VDRs.

In some embodiments, a host machine includes physical components that can serve as service resources in the network. For example, in some embodiments, a physical network interface controller (PNIC) of a host machine includes configurable resources such as TCAM (ternary content addressable memory) that can be used to implement services such as firewall.

The physical routers 805-806 are forwarding elements that do not operate virtualization software and do not operate software defined managed forwarding elements. In some embodiments, these are referred to as Top of Rack (ToR) routers that are installed to handle certain specific types of packet forwarding operations.

The host machines and the physical routers provide some of the computing and service resources. In some embodiments, the physical routers, VDR instances, and the DVS instances are some of the service resources of the datacenter. In some embodiments, one or more of the physical routers 805-806 or one or more of the VMs running in the host machines 801-804 can operate as edge nodes to provide network edge services. In some embodiments, these service resources are known to the network manager (or orchestration) for placement mapping the requested services. In some embodiments, some of these service resources are referred to by a particular service catalogue as corresponding to a particular level of service.

The VMs running on the host machines serve as some of the computing resources and services resources of the datacenter. Some of the VMs can be configured as computing resources to perform some of the application components being provisioned. Some of the VMs can be configured as service sources to perform some of the services required by the application such as load balancers, firewalls, edge, etc. In some embodiments, the virtualization software itself can be configured to serve as service resources. In some embodiments, a generic service can requires multiple service resources or forwarding elements to implement. For example, a service may require multiple routers or switches to be set up to allow packets to hop from a VM acting as a computing resource for an application component to another VM that is acting as a service resource for the application component.

In some embodiments, services such as Firewall, Intrusion Detection System (IDS), Intrusion Prevention System (IPS), Load Balancing, Encryption, and DHCP can be implemented by software service nodes. Software service nodes can be deployed at host machines or at L2/L3 boundaries to provide the required services. The services also can be inline services between the VNIC and the switch (e.g., software service node 841 between the VM 821 and the DVS 811). These software service nodes are software resources that the Network Manager can manage and manipulate to map the generic services in the template to the specific instantiations. In some embodiments, some of the services such as DHCP are implemented at edge routers. In some embodiments, a physical router such as 805 or 806 serves as an edge router. In some embodiments, a VM running on one of the host machines serves as an edge router.

As mentioned above in Section I, in some embodiments, application components are tagged with its required network services and the application provisioning process would identify the most "suitable" service resources for implementing those required services based on those tags. In some embodiments, the most suitable resource of a service is regarded as the resource that is better positioned to perform the service for the tagged application component than any other service resources. For example, if a particular application component assigned to a VM 821 on the host machine 801, then the service resources running on the same host machine 801 (such as the VSW 831) would be more suitable than service resources running on other host machines, because the VM 821 can communicate directly with the parts of the VSW 831 without going through the physical network 890. For some embodiments, this is an example of placement that is determined by topology of the network. On the other hand, a local resource of the host machine 801 would not be considered as suitable for an application component running on the VM 821 if it is already assigned to service another application, does not have the requisite computing power, or is not in position to serve as a point of enforcement.

In some embodiments, these services need not be preconfigured. The network manager provisions the services as the requests come in by deploying and configuring these services on-the-fly. In other words, the network manager consults the corresponding service templates and service catalogues to provision the necessary services only when such services are needed (according to request), and the placement of the services (and the application components) can be determined dynamically (e.g., based on the real-time state of the network).

In some embodiments, when the network manager deploys the application such as a Webserver or App server or a 3 tier application, based upon a service template, the firewall rules are plumbed at the relevant policy enforcement point such as a VNIC, an edge node or the host machine, where the vApps network is placed. In some embodiments, services like load balancing are automatically instantiated on the network serving the applications. In some embodiments, the distributed load balancing is used for providing the service. In some embodiments, the application profile or the service templates of the application specifies whether its services/rules are distributed or centralized.

Depending upon the number of servers in the application which are being load balanced and the range of the servers to which the load balancing pool is consisted of, some embodiments deploy a dedicated one arm load balancer in an L2 network in the datacenter which can serve the purpose. If the load is not adequate, the load balancer can be shared across a L3 domain and multiple configurations deployed on a single load balancer can form a cluster of load balancer. In some embodiments, each application has its own corresponding level of service. Similarly for services like IDS/IPS/encryption, some embodiments map service clusters to serve the various loads being generated by the application and place them at various points in the datacenter and instantiate policies to route these service traffic to these points of enforcement.

III. Computing Device

Figure 9:
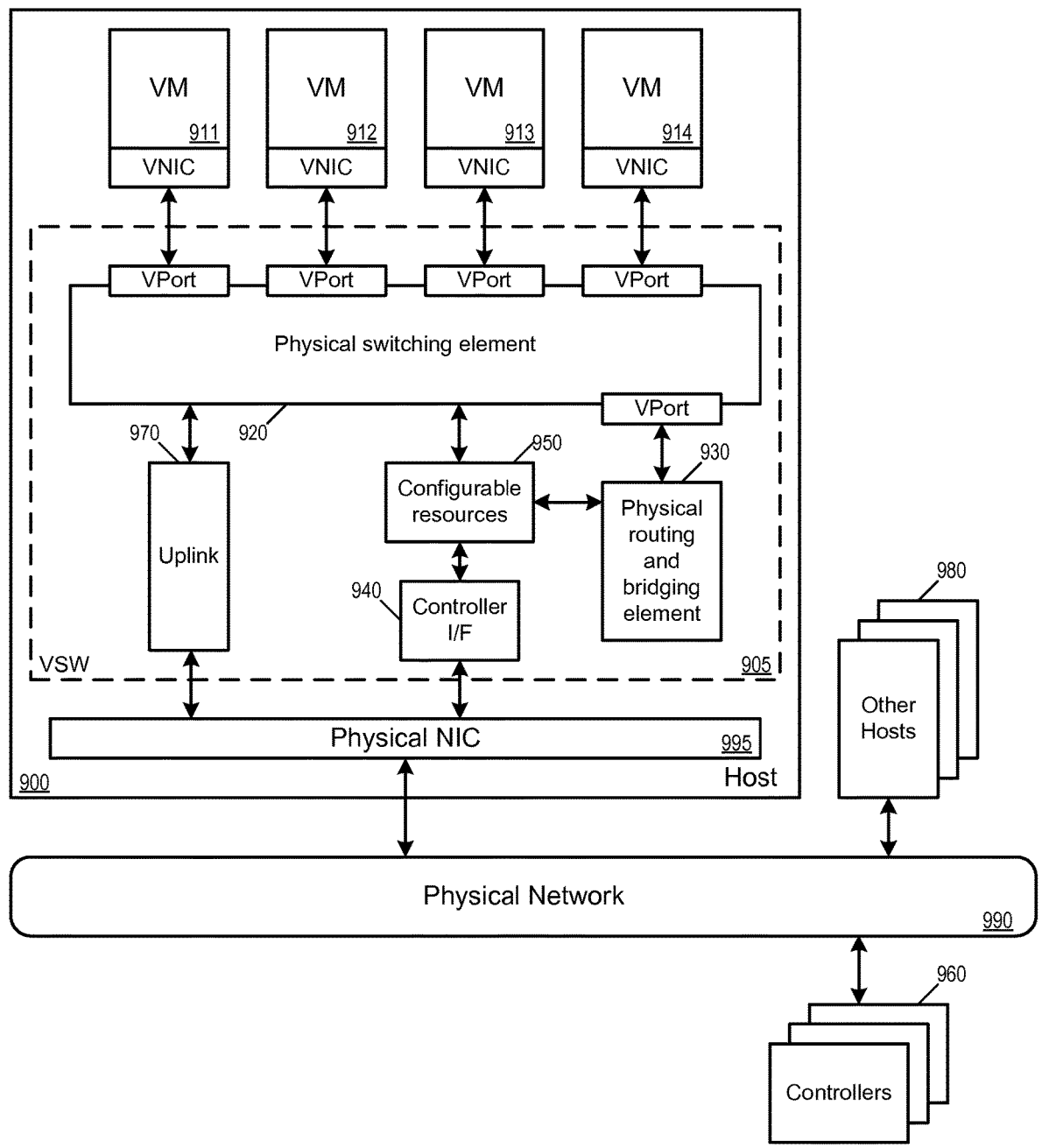
FIG. 9 illustrates an example host machine that is operating virtualization software for hosting virtual machines.

As mentioned earlier, some embodiments of the invention are implemented by virtualization software or hypervisors running on computing devices serving as host machines. For some embodiments, FIG. 9 illustrates an example host machine 900 that is operating virtualization software 905. The virtualization software 905 allows the host machine to host virtual machines 911-914 as well as connecting the virtual machines to a physical network 990. This physical network 990 may span one or more data centers and include various physical switches and routers.

As illustrated, the host machine 900 has access to the physical network 990 through a physical NIC (PNIC) 995. The virtualization software 905 serves as the interface between the hosted VMs 911-914 and the physical NIC 995 (as well as other physical resources, such as processors and memory). Each of the VMs includes a virtual NIC (VNIC) for accessing the network through the virtualization software 905. Each VNIC in a VM is responsible for exchanging packets between the VM and the virtualization software 905. In some embodiments, the VNICs are software abstractions of physical NICs implemented by virtual NIC emulators.

The virtualization software 905 manages the operations of the VMs 911-914, and includes several components for managing the access of the VMs to the physical network (by implementing the logical networks to which the VMs connect, in some embodiments). As illustrated, the virtualization software 905 includes a physical switching element 920, a physical routing element 930, a controller interface 940, an uplink module 970, and a set of configurable resources 950.

The controller interface 940 receives control plane messages from a controller or a cluster of controllers 960. In some embodiments, these control plane message includes configuration data for configuring the various components of the virtualization software and/or the virtual machines (such as the physical switching element 920 and the physical routing element 930). In some embodiments, the control plane messages also include locale-specific configuration information from a central network manager or a local network manager.

The physical switching element 920 (or managed physical switching element, MPSE) delivers network data to and from the physical NIC 995, which interfaces the physical network 990. The physical switching element also includes a number of virtual ports (vPorts) that communicatively interconnects the physical NIC with the VMs 911-914, the physical routing element 930 and the controller interface 940. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 990 (e.g., another VM running on another host).

The physical routing element 930 (or managed physical routing element, MPRE) performs L3 routing (e.g., by performing L3 IP address to L2 MAC address resolution) on data packets received from a virtual port on the physical switching element 920. In some embodiments, the virtual port that the physical routing element 930 is attached to is a sink port. Each routed data packet is then sent back to the physical switching element 920 to be forwarded to its destination according to the resolved L2 MAC address. This destination can be another VM connected to a virtual port on the physical switching element 920, or a reachable L2 network element on the physical network 990 (e.g., another VM running on another host, a physical non-virtualized machine, etc.).

The set of configurable resources 950 enables the virtualization software 905 to be configured to serve as computing and/or service resources. For example, in some embodiments, the set of configurable resources includes a set of programmable logic circuits that can be configured to store rules and provide rule matching capabilities for network services such as firewalls. In some of these embodiments, these configurable resources are acting in conjunction with other resources in the host machine (such as a TCAM in the PNIC) to provide services such as firewall. Examples of using virtualization software to implement firewall services can be found in U.S. patent application Ser. No. 14/295,544 titled "Use of Stateless Marking to Speed Up Stateful Firewall Rule Processing".

The uplink module 970 relays data between the physical switching element 920 and the physical NIC 995. In some embodiments, the uplink module 970 allows the host machine 900 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 900 sends a data packet (e.g., an ethernet frame) to another VM in the same VXLAN network but on a different host, the uplink module 970 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 970 also decapsulates incoming VXLAN packets and forwards only the original inner data packet to the destination VM.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
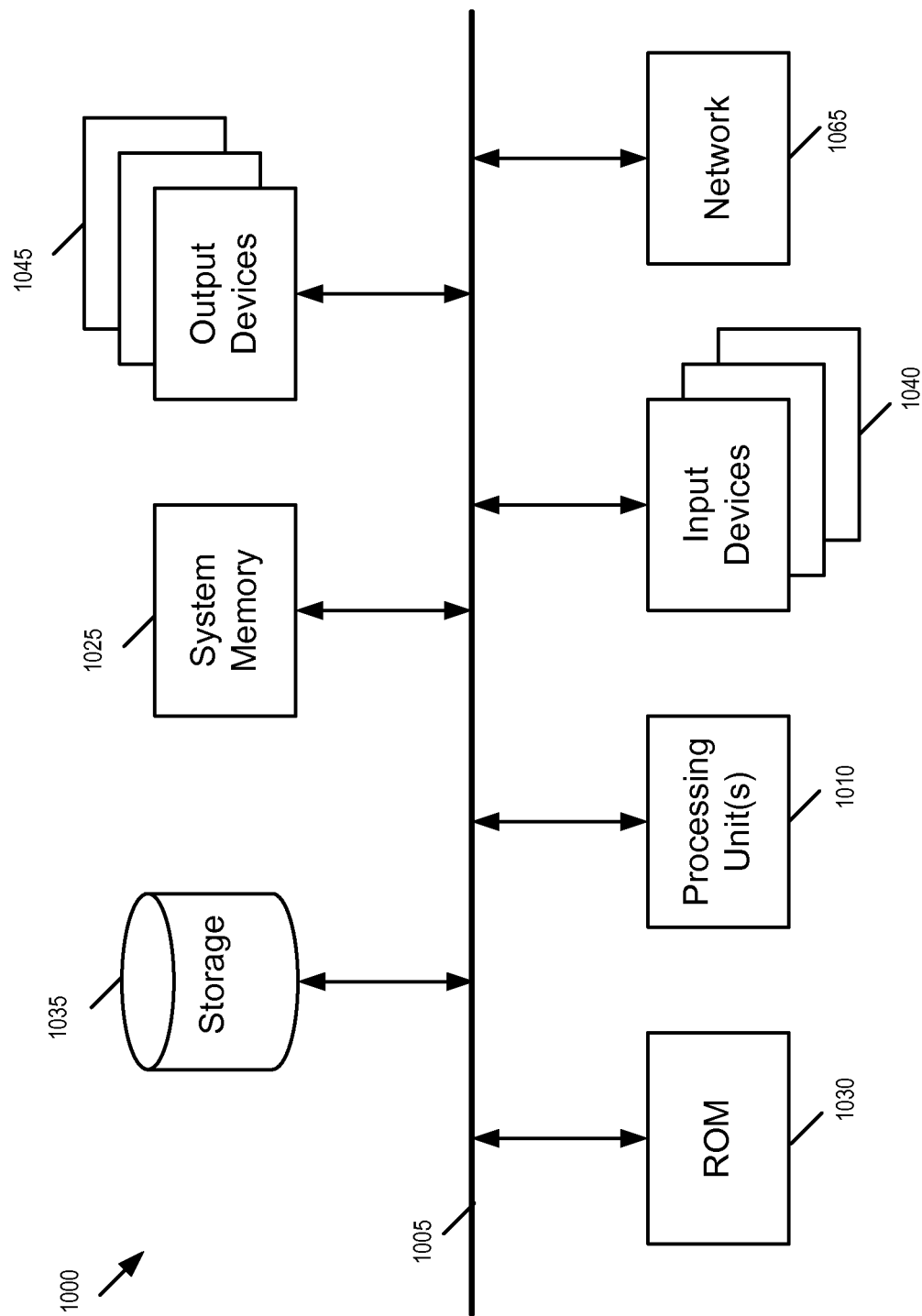
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for deploying multi-component applications with generically specified network services in a network comprising computing machines and service resources, the method comprising:

receiving a request to deploy (i) an application with a plurality of components in the network, and (ii) a set of network services generically specified for the application by a set of parameters that specify network services required by the application without referring to specific service resources;

deploying the application by assigning each application component to a computing machine, wherein at least two different application components are assigned to two different computing machines executing on two different host computers;

for each of a plurality of application components associated with a subset of network services, identifying, based on the set of parameters that generically specify network services required by the application without referring to specific service resources, a set of particular service resources in the network to implement one or more network services in the subset of network services for the application; and configuring each identified set of particular service resources to implement the subset of generically specified network services for each of the plurality of application components associated with the subset of network services.

2. The method of claim 1, wherein identifying the set of particular service resources is further based on a current workload status of the network.

3. The method of claim 1, wherein identifying the set of particular service resources further comprises identifying the set of particular service resources based at least partly on a proximity in the network of the identified set of particular service resources to a computing machine assigned to an application component for which a subset of network services are being performed.

4. The method of claim 1, wherein at least one of the identified set of particular service resources is provided by a service module that is part of virtualization software executing on a particular host computer.

5. The method of claim 1, wherein at least one of the identified set of particular service resources is a service virtual machine executing on a particular host computer, and at least one computing machine is another virtual machine executing on the particular host computer.

6. The method of claim 1, wherein the identified set of particular service resources comprise an edge service node that operates at a boundary of the network.

7. The method of claim 1, wherein the set of generically specified network services comprises at least one of a load balancing service, a network address translation service, an encryption service, a DHCP service, a VPN service, and a firewall service.

8. The method of claim 1 further comprising associating each of the plurality of application components associated with a subset of network services with a set of service tags, each service tag identifying a network service in the subset of network services that is needed for the associated application component.

9. A non-transitory machine readable medium storing a program that when executed by at least one processing unit deploys multi-component applications with generically specified network services in a network comprising computing machines and service resources, the program comprising sets of instructions for:

receiving a request to deploy (i) an application with a plurality of components in the network, and (ii) a set of network services generically specified for the application by a set of parameters that specify network services required by the application without referring to specific service resources;

deploying the application by assigning each application component to a computing machine, wherein at least two different application components are assigned to two different computing machines executing on two different host computers;

for each of a plurality of application components associated with a subset of network services, identifying, based on the set of parameters that generically specify network services required by the application without referring to specific service resources, a set of particular service resources in the network to implement one or more network services in the subset of network services for the application; and configuring each identified set of particular service resources to implement the subset of generically specified network services for each of the plurality of application components associated with the subset of network services.

10. The non-transitory machine readable medium of claim 9, wherein identification of the set of particular service resources is further based on a current workload status of the network.

11. The non-transitory machine readable medium of claim 9, wherein the set of instructions for identifying the set of particular service resources further comprises a set of instructions for identifying the set of particular service resources based at least partly on a proximity in the network of the identified set of particular service resources to a computing machine assigned to an application component for which a subset of network services are being performed.

12. The non-transitory machine readable medium of claim 9, wherein at least one of the identified set of particular service resources is provided by a service module that is part of virtualization software executing on a particular host computer.

13. The non-transitory machine readable medium of claim 9, wherein at least one of the identified set of particular service resources is a service virtual machine executing on a particular host computer, and at least one computing machine is another virtual machine executing on the particular host computer.

14. The non-transitory machine readable medium of claim 9, wherein the identified set of particular service resources comprise an edge service node that operates at a boundary of the network.

15. The non-transitory machine readable medium of claim 9, wherein the set of generically specified network services comprises at least one of a load balancing service, a network address translation service, an encryption service, a DHCP service, a VPN service, and a firewall service.

16. The non-transitory machine readable medium of claim 9, wherein the program further comprises a set of instructions for associating each of the plurality of application components associated with a subset of network services with a set of service tags, each service tag identifying a generically specified network service in the subset of network services that is needed for the associated application component.

* * * * *